United States Patent [19]

Goebels et al.

[11] 3,944,290
[45] Mar. 16, 1976

[54] MOTOR VEHICLE BRAKE SYSTEM WHEEL LOCK PREVENTION DEVICE

[75] Inventors: Hermann J. Goebels, Schwieberdingen; Klaus-Otto Riesenberg, Ludwigsburg-Ossweil; Helmut Rembold, Moglingen, all of Germany

[73] Assignee: Robert Bosch GmbH, Stuttgart, Germany

[22] Filed: Apr. 1, 1975

[21] Appl. No.: 563,968

[30] Foreign Application Priority Data
Apr. 20, 1974 Germany............... 2419135

[52] U.S. Cl. .................. 303/21 F; 303/40; 303/68
[51] Int. Cl.² .................. B60T 8/02; B60T 15/02
[58] Field of Search ............ 303/21 F, 40, 61–63, 303/68–69; 188/181 A

[56] References Cited
UNITED STATES PATENTS

| | | | |
|---|---|---|---|
| 3,731,980 | 5/1973 | Fink et al. ...................... | 303/21 F |
| 3,823,987 | 7/1974 | Kurichh ............................ | 303/21 F |
| 3,836,209 | 9/1974 | Neisch ............................. | 303/21 F |
| 3,854,501 | 12/1974 | Machek .......................... | 303/21 F X |
| 3,874,744 | 4/1975 | Huber .............................. | 303/21 F |

Primary Examiner—Trygve M. Blix
Assistant Examiner—Douglas C. Butler
Attorney, Agent, or Firm—Edwin E. Greigg

[57] ABSTRACT

An improved wheel lock prevention device for use in the brake system of motor vehicles. The device has a relay valve included in assembly with a motor vehicle operator controlled brake velve, a wheel brake cylinder and a source of pressurized air. The relay valve has a primary and secondary pressure side. The primary pressure side is connected to the brake valve and the secondary side is connected to the wheel brake cylinder. A short circuit connection between the primary and secondary pressure sides is provided with a control for effecting a balancing of the pressures on both the primary and secondary pressure sides after the pressure on both sides has been reduced from a peak value by a desired extent during application of the brake system.

11 Claims, 9 Drawing Figures

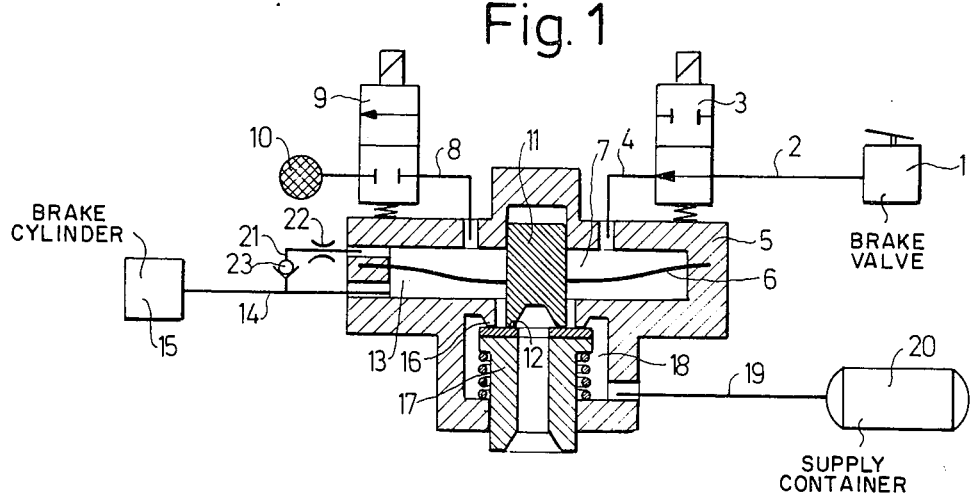
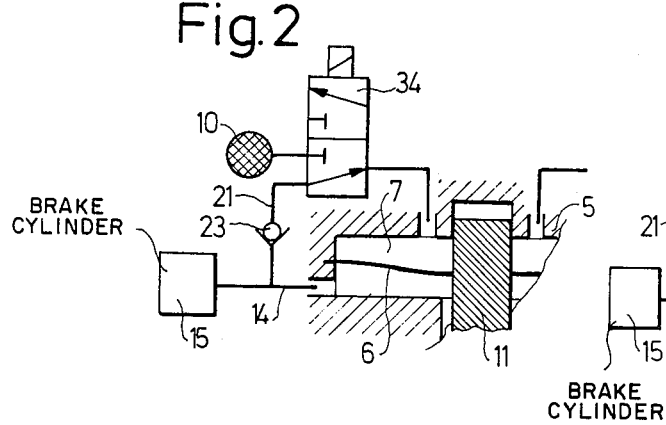
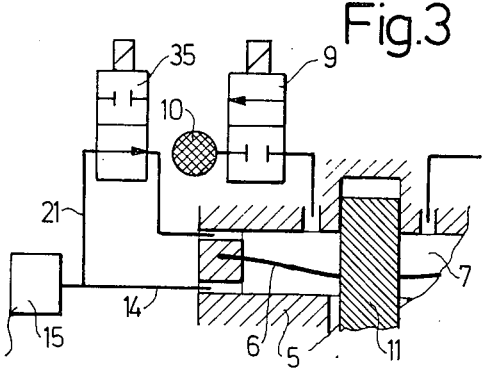
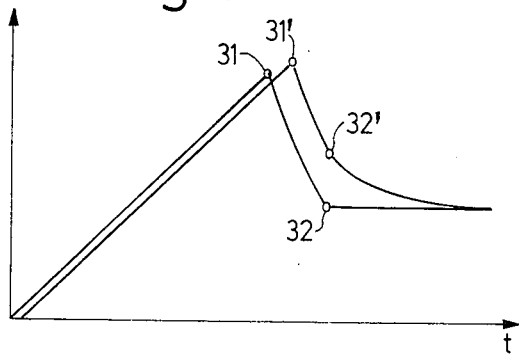
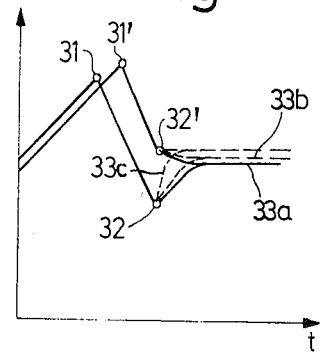

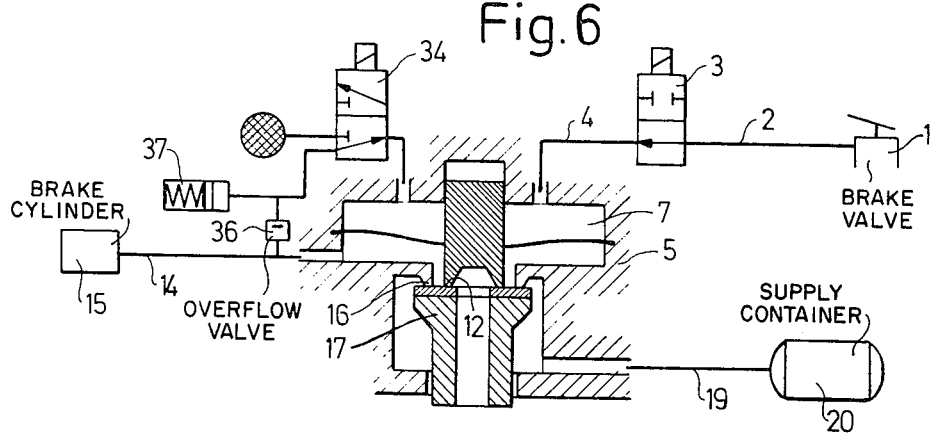
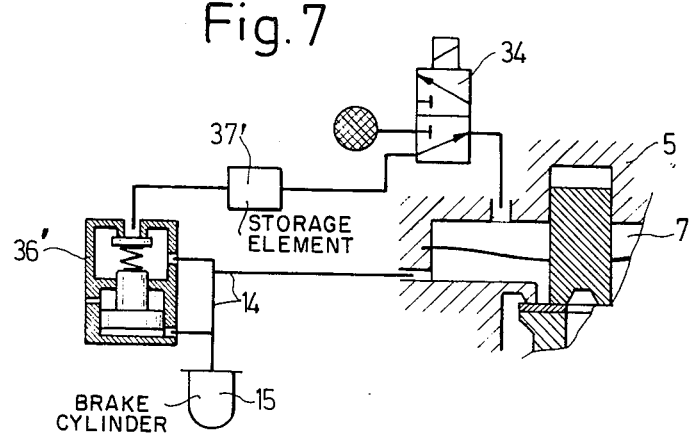
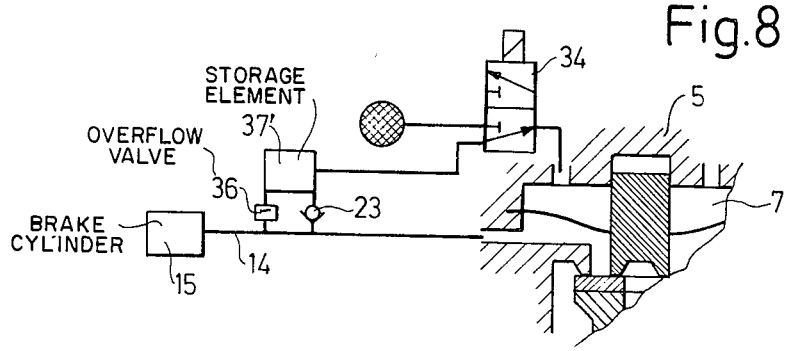

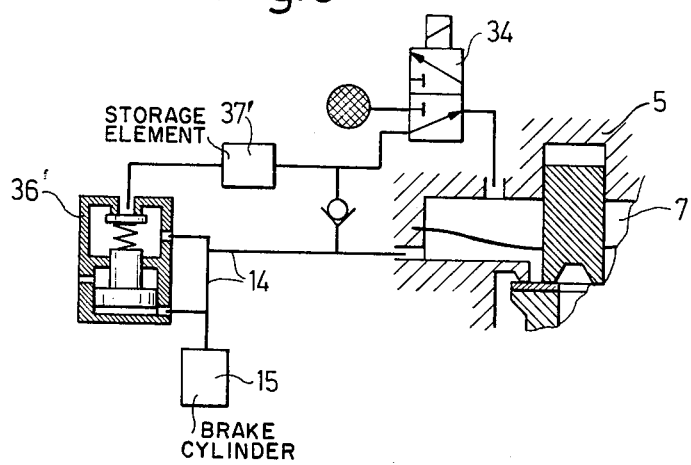

3,944,290

MOTOR VEHICLE BRAKE SYSTEM WHEEL LOCK PREVENTION DEVICE

BACKGROUND OF THE INVENTION

The present invention relates to a wheel lock prevention device and in particular to wheel lock prevention device for motor vehicles comprising a relay valve having a primary side on which side the relay valve is actuated by pressurized air controlled via a brake valve which in turn is controlled by the motor vehicle operator. The relay valve also has a secondary side, from which side the pressure in a wheel brake cylinder is controlled by way of a double valve, the wheel brake cylinder being alternately connected via the double valve to a source of pressurized air or to an outside air connection.

A wheel lock prevention device of this type is known. The relay valves used in the known device are designed to allow the pressurized air controlled by the motor vehicle operator's brake valve to pass to the brake cylinder from a pressurized air supply proportionally over a large valve cross-section of the double valve.

A requirement of wheel lock prevention devices is rapid pressure reduction and short switching periods. However, with rapid pressure reduction, a synchronization difference is produced between the primary and secondary pressure. In the holding stage, the primary pressure controlled via the magnetic valves then determines the actual value of the holding pressure. Thus, the secondary pressure is always reduced by the amount of the synchronization difference and thus the braking force coefficient, that is, the ground adhesion of the wheel is not utilized efficiently.

OBJECT AND SUMMARY OF THE INVENTION

It is a principal object of the present invention to obviate the above disadvantages and to provide a wheel lock preventing device of the type described above wherein the mode of operation of a proportionally acting regulating relay valve is improved so as to eliminate the aforementioned difficulty.

This object is accomplished according to the prevent invention by providing a short circuit connection between the primary side and the secondary side of the relay valve which is controlled by a control device.

Other objects, features and advantages of the present invention will be made apparent in the following detailed description of various preferred embodiments thereof provided with reference to the accompanying drawings.

BRIEF DESCRIPTION OF THE DRAWINGS

FIG. 1 illustrates a relay valve and a short circuit connection according to a first embodiment of the present invention.

FIG. 2 partially illustrates the relay valve of FIG. 1 and a short circuit connection according to a second embodiment of the present invention.

FIG. 3 partially illustrates the relay valve of FIG. 1 and a short circuit connection according to a third embodiment of the present invention.

FIGS. 4 and 5 provide a comparison of diagrams showing the variation of the pressure in a conventional wheel lock prevention device (FIG. 4) and a wheel lock prevention device according to the present invention (FIG. 5), and FIGS. 6-9 illustrate four further embodiments of the short circuit connection according to the present invention.

DESCRIPTION OF THE PREFERRED EMBODIMENTS

Referring initially to FIG. 1, there is shown a brake pedal actuated brake valve 1 connected via a line 2 to a 2/2 way magnetic inlet valve 3 and by a line 4 from the valve 3 to a relay valve 5. The relay valve 5 comprises a control membrane 6 which separates a primary circuit from a secondary circuit. On the primary side of the membrane 6 there is defined a control chamber 7 to which the line 4 and a line 8 are connected. The line 8 passes via a magnetic outlet valve 9 to an outside air connection 10. On the secondary side of the membrane 6 there is defined a control chamber 13 which is in continuous communication with a wheel brake cylinder 15 via a line 14.

The control membrane 6 has a valve stem 11 attached thereto. The valve stem 11 passes through the chambers 7 and 13. The valve stem 11 penetrates the membrane 6 and forms a valve seat 12 at one end, while a second valve seat 16 is formed as an annular shoulder in the relay valve 5. A spring-biased closing element 17 cooperates with the two valve seats 12 and 16. The closing element 17 is disposed in a valve chamber 18 to which a pressure air supply container 20 is connected via a supply line 19. The double valve 12, 16, 17, formed by the closing element 17 and the two valve seats 12 and 16, the valve chamber 18, the line 19, the supply container 20, the chamber 13, the line 14 and the brake cylinder 15 together form the secondary circuit and are disposed on the secondary side of the relay valve 5.

Between the primary side and the secondary side of the relay valve 15, there is provided a short circuit connection 21 which is controlled by a control device. In the embodiment shown in FIG. 1 this control device consists of a throttle 22 and a check valve 23 opening on the primary side.

The operation of the wheel lock prevention device will now be described with reference to the diagrams shown in FIGS. 4 and 5.

FIG. 4 shows the variation of the pressure over a period of time in a conventional wheel lock prevention device comprising a relay valve. The primary pressure rises from 0 to a point 31, at which the two magnetic valves 3 and 9 are reversed, switched, and the braking pressure is reduced. The secondary pressure lags somewhat behind, but, owing to the inertia of the relay valve 5, it reaches a slightly higher value 31' before it is reduced. In the primary circuit the pressure is lowered to the point 32 at which time the pressure in the secondary circuit has been lowered to the point 32'. At the point 32' the brake pressure in the secondary circuit has been reduced to such an extent that an electronic control device (not shown) terminates the reduction stage by switching the magnetic outlet valve 9 into its shut off position. However, at this point in time, the primary pressure has already fallen to the point 32 and thus the secondary pressure, that is, the brake pressure in the brake cylinder 15, is further reduced to the level of the point 32 through the proportional effect of the conventional wheel lock prevention devices. As a result, insufficient pressure modulation occurs which leads to further, undesired releasing of the brake.

According to the present invention, to eliminate this insufficient pressure modulation, equalization balancing of the primary circuit and the secondary circuit is now produced in the following manner during the holding state, that is, from point 32 onwards.

As the volume of the brake cylinder 15 is considerably greater than the volume in the control chamber 7 and as the brake pressure is initially higher than the pressure in the control chamber, pressurized air passes from the brake cylinder 15 via the check valve 23 and the throttle 33 into the control chamber 7. This continues until a pressure equalization is achieved in the following pressure holding stage, as represented by the line 33a in the diagram shown in FIG. 5.

However, this arrangement has the disadvantage that the air flowing via the throttle 22 from the brake cylinder 15 into the control chamber 7 changes the steepness of the control pressure up to the point 32.

In the embodiment illustrated in FIG. 2, this is avoided in that, in addition to the check valve 23, the control device employs a 3/2-way magnetic valve 34 in place of the 2/2-way magnetic outlet valve 9 in the short circuit connection. The remaining parts of the embodiment illustrated in FIG. 2 bear the identical references to those of the embodiment represented in FIG. 1. The 3/2-way magnetic valve 34 connects the brake cylinder 15 with the control chamber 7 in the pressure holding stage and blocks (cuts) off this connection when the brake pressure is reduced. Thus the throttle 22 can be eliminated. When the brake pressure increases the connection is interrupted by the check valve 23. The pressures are equalized more rapidly. The holding pressure reaches approximately the value 32' with the curve 33b.

Complete pressure equalization in the holding stage prevents the check valve 23 from responding.

For this reason, FIG. 3 illustrates a construction in which pressure equalization is produced with only a 2/2-way magnetic valve 35 in the short circuit connection. The throttle 22 and the check valve 23 have been removed. The 2/2-way magnetic valve 35 is controlled by the switching impulses for the magnetic outlet valve 9 and the magnetic inlet valve 3 being coupled together. As a result, it is not necessary to provide an additional electrical control line for the magnetic valve 35. This 2/2-way magnetic valve 35 is open for a short time at the beginning of the holding stage, thus permitting pressure equalization. The valve 35 is closed during the brake pressure increase and in the reduction stage. With this type of construction, pressure equalization is complete and the holding pressure is higher than that of the arrangement shown in FIG. 2 by the closing pressure of the check valve 23. This is another step in the direction of meeting the requirement of reduced undermodulation of the pressure. The dashed line 33c in FIG. 5 shows the course of this pressure.

FIG. 6 illustrates another embodiment of the invention.

Proceeding from the arrangement shown in FIG. 2, this embodiment comprises in the short circuit connection 21, an overflow valve 36 and an additional storage volume in the storage element 37.

This arrangement operates in the following manner.

When the 3/2-way magnetic valve 34 is reversed, an equal pressure to the primary pressure is built-up in the storage element 37. In the reduction stage, the storage volume is blocked off from the control chamber 7 by closing the 3/2-way magnetic valve. As a result of the decreasing pressure in the control chamber 7, the brake cylinder pressure is also reduced via the double valve 12, 16, 17. Upon reaching a specific pressure difference, the overflow valve 36 opens and, while retaining this pressure difference, a proportional pressure reduction takes place in the storage element 37.

When the reduction stage has been terminated, the control chamber 7 is again brought into communication with the storage element 37 by opening the 3/2-way magnetic valve 34. The now higher storage pressure causes a rapid pressure equalization. As the pressure undermodulation increases when the pressure level rises, with high pressures, a larger quantity of air is required to equalize the pressures than with smaller brake pressures. This problem is solved by filling the storage element 37 as a function of the pressure. The diagram according to FIG. 5 indicates by the line 33c the complete pressure equalization of the brake cylinder pressures at the point 32'.

It is also possible to provide a storage element 37' having a constant volume and to change the pressure difference as shown in FIG. 7. In this figure the reference number 36' relates to an overflow valve controlled as a function of the pressure.

Lastly, it is also possible to couple the arrangement shown in FIG. 2 with the last arrangement as shown in FIGS. 8 and 9. FIG. 8 shows the check valve 23 connected in parallel with the simple overflow valve 36 which has a constant overflow pressure.

FIG. 9, on the other hand, shows the overflow valve 36' shown in FIG. 7, which is controlled as a function of the pressure. By means of these measures, the storage volume can be kept to a minimum.

Even though the embodiments according to FIGS. 6–9 show no spring loading of the closing element 17 it must be stated that embodiments such as these provide for such a spring loading. The loading can be similar to that shown in FIG. 1.

What is claimed is:

1. In a wheel lock prevention device for use in the brake system of motor vehicles, the combination comprising: a relay valve; a motor vehicle operator controlled brake valve; a wheel brake cylinder; and a source of pressurized air, wherein the relay valve includes: means defining a primary pressure side and a secondary pressure side, with the primary pressure side having means for connecting the primary pressure side to the brake valve for actuation therefrom, and with the secondary pressure side having means for connecting the secondary pressure side to the wheel brake cylinder; means on the secondary pressure side defining a double valve; means connecting the double valve to the source of pressurized air; and further means for connecting the double valve to the atmosphere, the double valve serving to connect the secondary pressure side to either the source of pressurized air or the atmosphere, the improvement comprising:
   a. a short circuit connection which extends between and connects the primary pressure side with the secondary pressure side; and
   b. control means connected to said short circuit connection for controlling the short circuit connection in order to effect balancing of the pressures on both the primary and secondary pressure sides after the pressure on the primary and secondary sides has been reduced from a peak value by a desired extent during application of the brake system.

2. The wheel lock prevention device as defined in claim 1, wherein the short circuit connection to the secondary pressure side of the relay valve is effected through the means for connecting the secondary pressure side to the wheel brake cylinder.

3. The wheel lock prevention device as defined in claim 1, wherein the control means includes a throttle and a check valve opening on the secondary pressure side.

4. The wheel lock prevention device as defined in claim 1, wherein the control means includes a 3/2-way magnetic valve and a check valve opening on the secondary pressure side.

5. The wheel lock prevention device as defined in claim 1, wherein the control means includes a 2/2-way magnetic valve.

6. The wheel lock prevention device as defined in claim 1, wherein the control means includes a 3/2-way magnetic valve, a storage element and an overflow valve.

7. The wheel lock prevention device as defined in claim 6, wherein the volume of the storage element is variable as a function of the brake pressure.

8. The wheel lock prevention device as defined in claim 1, wherein the control means includes a 3/2-way magnetic valve, a storage element having a constant volume and an overflow valve, adapted to be filled as a function of the brake pressure.

9. The wheel lock prevention device as defined in claim 8, wherein the overflow valve has an opening pressure controllable as a function of the brake pressure.

10. The wheel lock prevention device as defined in claim 1, wherein the control means includes a 3/2-way magnetic valve, a storage element having a constant volume and a check valve and an overflow valve connected in parallel.

11. The wheel lock prevention device as defined in claim 10, wherein the overflow valve has an opening pressure controllable as a function of the brake pressure.

* * * * *